United States Patent [19]

Siegenthaler

[11] Patent Number: 4,954,064
[45] Date of Patent: Sep. 4, 1990

[54] APPARATUS FOR WINDING SHEETS OF DOUGH ON A DOUGH REEL AND DOUGH SHEETER EQUIPPED WITH A DOUGH SHEETER WINDER

[75] Inventor: Peter Siegenthaler, Toffen, Switzerland

[73] Assignee: Seewer AG, Burgdorf, Switzerland

[21] Appl. No.: 223,290

[22] Filed: Jul. 22, 1988

[30] Foreign Application Priority Data

Jul. 29, 1987 [DE] Fed. Rep. of Germany ....... 3725090

[51] Int. Cl.⁵ .............................................. A21C 3/06
[52] U.S. Cl. .................................. 425/162; 99/450.1; 264/40.2; 425/141; 425/321; 425/322; 425/373; 425/391; 426/501
[58] Field of Search ................ 425/162, 163, 319–322, 425/391, 373, 141; 99/353, 462, 464, 450.1; 264/40.2; 426/231, 496, 500, 501

[56] References Cited

U.S. PATENT DOCUMENTS

| 1,280,467 | 10/1918 | Hicks | 425/321 |
| 1,988,047 | 1/1935 | Peters | 425/320 X |
| 3,225,717 | 12/1965 | Page | 425/320 X |
| 3,370,555 | 2/1968 | Schrauf | 425/320 X |
| 3,603,268 | 9/1971 | Wietzel et al. | 425/320 X |
| 3,947,179 | 3/1976 | Kemper | 425/320 X |
| 4,110,482 | 8/1978 | Sato | 425/322 X |
| 4,555,226 | 11/1985 | Benier | 425/320 X |
| 4,741,263 | 5/1988 | Ueno et al. | 425/321 X |

FOREIGN PATENT DOCUMENTS 2718383 4/1979 Fed. Rep. of Germany.
8602808 5/1986 World Int. Prop. O. .......... 425/320

Primary Examiner—Richard L. Chiesa
Attorney, Agent, or Firm—Salter & Michaelson

[57] ABSTRACT

The pivoting of a guide roller (20) together with a conveyor belt (19) running around it, as well as a pressing roller (25), from a standby position (A) into a resting position (B) is optimized both for thick dough and for thin dough. The pivoting operation takes place in the case of thick dough after one turn has been wound on the dough reel (18). For thin dough, the pivoting operation takes place after about two turns of the dough are on the reel.

7 Claims, 6 Drawing Sheets

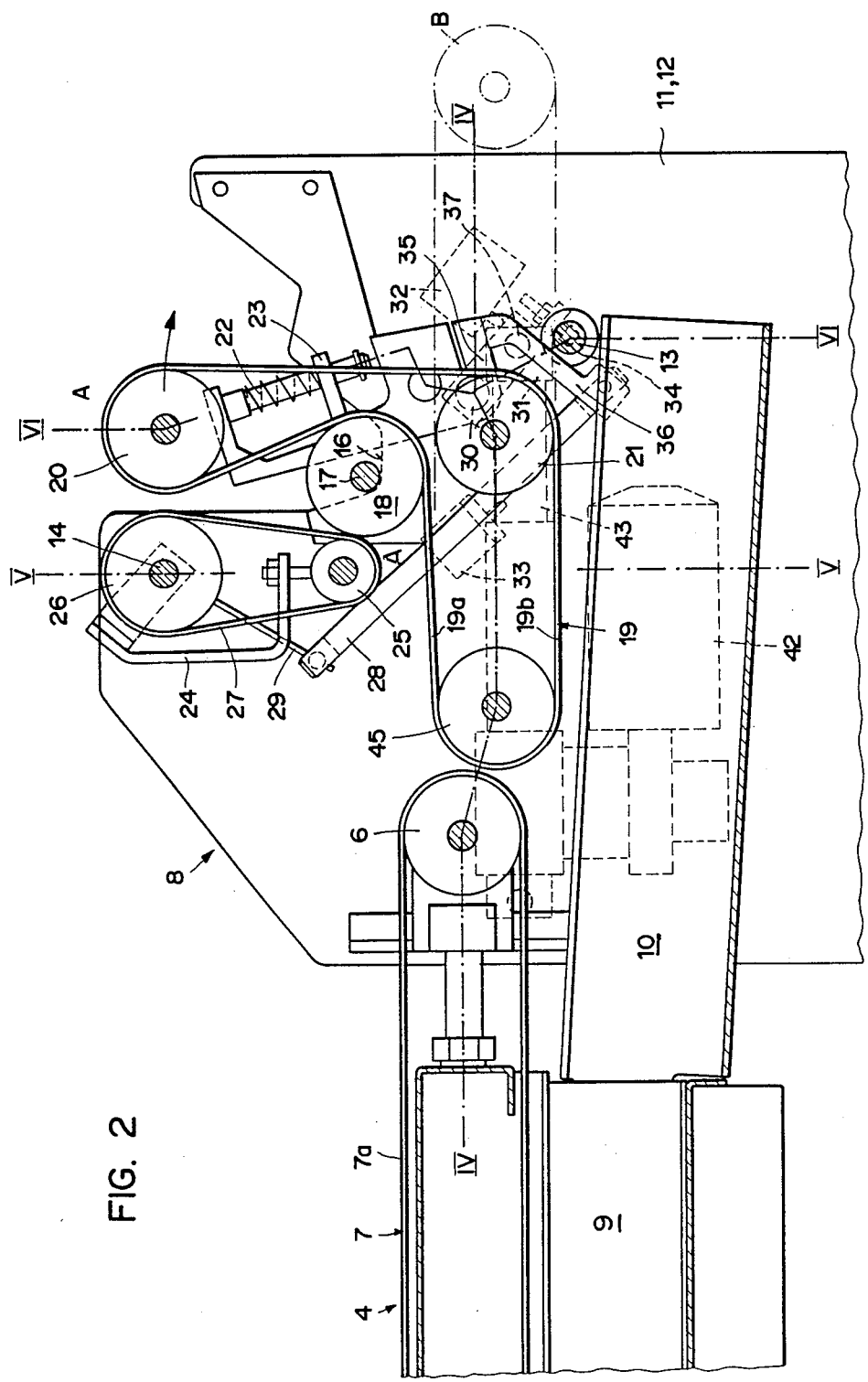

APPARATUS FOR WINDING SHEETS OF DOUGH ON A DOUGH REEL AND DOUGH SHEETER EQUIPPED WITH A DOUGH SHEETER WINDER

BACKGROUND AND SUMMARY OF THE INVENTION

This invention relates to baking equipment, and more particularly to a method of winding a sheet of dough on a dough reel; to a dough sheeter having a dough-sheet winding device, the dough sheeter being of the type equipped with two conveyors disposed on the near side and the far side, respectively, of a pair of cylinders, each conveyor having a frame, two rollers, and a conveyor belt, and the dough-sheet winding device being affixed to the frame of one of the aforementioned conveyors; and to a dough-sheet winding device for a dough sheeter, of the type having a dough reel and a conveyor belt intended for receiving and conveying the dough sheet to the dough reel, which conveyor belt runs over a drive roller, a support roller, and a guide roller and, in a stand-by position of the guide roller, rests in at least one partial area against the dough reel.

West German Patent No. 2,718,383 discloses a dough-sheet reel on a dough-sheeting plant equipped with two conveyors disposed on the near side and the far side, respectively, of a pair of cylinders, each having a frame, two rollers, and a conveyor belt, a chassis with side plates being fixed to the frame of one of the mentioned conveyors, which plates have recesses for axle parts of a reel which are aligned to one another in transverse direction and open at the top, there being a conveyor belt driven at high speed from this one conveyor and intended to take over a sheet of dough delivered thereon, the two belt-sides of which are supported on a support roller disposed beneath the reel and opposite it and mounted stationary on the side plates, the conveyor belt further running over a guide roll which is disposed on a swivel support mounted somewhat beneath the support roller on the side plates in such a way that when the swivel support is swung up into a stand-by position, the upper belt-side, starting from the location at which it runs through between the support roller and the reel, winds around the reel over about one-fourth of its circumference in order to initiate the winding of a sheet of dough resting thereon, and a sensing and locking arm mounted on the swivel support, which arm, in the stand-by position of the swivel support, (a) co-operates with a snap member fixed on the adjacent side plate in order to keep the swivel support in the stand-by position and (b) senses the height of the reel in order to detach itself from the snap member when the reel has taken on a predetermined number of dough-sheet thicknesses and thus to release the swivel support, which can then be swung back out of the stand-by position in order that the further winding of the sheet of dough on the upwardly travelling reel may take place unhindered.

Drawbacks of this prior art dough-sheet winding device are, firstly, that the swivel support must be manually moved from a resting position into a stand-by position and, furthermore, that when thick sheets of dough, e.g., between 4 and 10 mm, are being wound, the trip angle is reached before the first turn is completed, or else the abruptly increasing space requirement leads to blocking of the dough reel. When thin sheets of dough between, say, 1 and 4 mm are being wound up, there are already too many turns on the dough reel when the trip angle is reached. The turns are then too tightly superposed, whereby the dough tends to stick together, resulting in problems when the sheet of dough is unwound.

It is therefore the object of this invention to provide an improved method of winding a sheet of dough on a dough reel, an improved dough sheeter having a dough sheet winding device, and an improved dough-sheet winding device, which method and devices do not have the drawbacks of the above-mentioned prior art.

A further object of the invention is to provide a method and devices whereby, when thick sheets of dough are being wound, the swivel support is automatically swung away after about one revolution in order to provide the necessary space for winding the thick sheet of dough on the dough reel.

Still another object of the invention is to provide a method and devices whereby, when thin sheets of dough are being wound, the swivel support swings away after about two revolutions so that the sheet of dough can be wound without hindrance, and the turns do not lie too tightly on one another as with the prior art device.

To this end, in the method according to the present invention, after the last sheeting pass of the sheet of dough between the cylinders, this pass is detected by a sensor means, and the sheet of dough is then fed by a conveyor to a conveyor belt of a dough-sheet winding device and wound on a dough-reel, a guide roller connected to a swivel support being pivoted from a resting position into a stand-by position after detection of the last sheeting pass of the sheet of dough by the sensor means, and after an adjustable time-lag which starts to run upon the detection of the last sheeting pass by the sensor means, the guide roller connected to the swivel support being pivoted from the stand-by position into the resting position, the conveyor belt pressing the sheet of dough against the dough reel in the stand-by position.

In the dough sheeter according to this invention, of the type initially mentioned, there is a conveyor belt driven by a conveyor and intended to take over a sheet of dough, at least one belt-side of which conveyor belt is supported on a support roller disposed beneath a reel and permanently mounted, the conveyor belt further running around a guide roller disposed on the swivel support pivotable by a motor in such a way that the upper belt-side of the conveyor belt winds around the reel on part of the circumference thereof in order to initiate the winding of the sheet of dough resting on the conveyor belt, and the swivel support is pivotable by the motor into a resting position after an adjustable winding phase of the sheet of dough onto the reel in such a way that the further winding of the sheet of dough onto the reel can take place unhindered.

In the dough-sheet winding device according to the invention, a swivel support connected to the guide roller and operatable by a motor is disposed swivellably from the stand-by position into a resting position.

DESCRIPTION OF THE DRAWINGS

A preferred embodiment of the invention and its use will now be described in detail with reference to the accompanying drawings, in which:

FIG. 2 is a side elevation of the sheet winder, a swivel support being in the stand-by position A.

DESCRIPTION OF THE INVENTION

Figure 1:
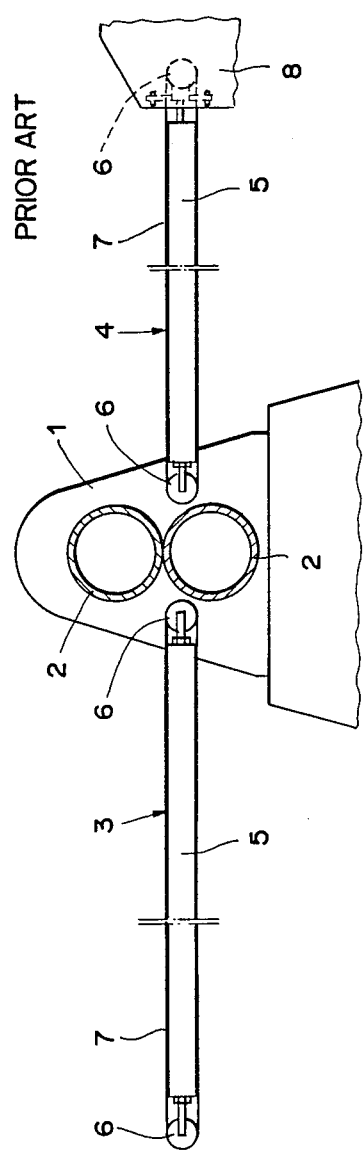
FIG. 1 is a side elevation of a prior art dough sheeter with the sheet winder.

FIG. 1 shows a housing 1 of a conventional dough-rolling installation comprising a pair of superposed sheeting cylinders 2 and two conveyors 3 and 4 respectively disposed on the near and far sides of this pair of cylinders. Each of the conveyors 3 and 4 has a frame 5, two rollers 6, and a conveyor belt 7. At the right-hand end of the conveyor 4, as viewed in FIG. 1, a dough-sheet winder 8 is represented diagrammatically.

In FIG. 2, sheet winder 8 is shown in detail in a side elevation. This sheet winder is disposed within two side plates 11 and 12, rigidly connected to one another by a cross-brace 13 and borne by a chassis 9, 10 fixed to frame 5. Side plates 11 and 12 each include a recess 16, open at the top, for receiving the axle 17 of dough reel 18.

Sheet winder 8 comprises its own conveyor belt 19, which runs over a drive roller 45, an idle guide roller 20, and a support roller 21. Conveyor belt 19 likewise runs over part of the circumference of dough reel 18 and sets it rotating. In contrast to the prior art device mentioned earlier, upper belt-sides 7a and 19a of conveyor belts 7 and 19 are no longer so greatly displaced in height relative to one another. This proves advantageous particularly in the fabrication of thick sheets of dough. Drive roller 45 is driven by roller 6 at the end of dough conveyor belt 7. Guide roller 20 is held resiliently on swivel supports 23 by means of tension springs 22. A belt 27 rests against dough reel 18 in the stand-by position A and ensures that the sheet of dough winds around reel 18. Roller 26 is likewise driven by roller 6 at the end of conveyor belt 7. An extension 36 of swivel support 23 is hinged to a spring rod 29 via a connecting rod 28. Spring rod 29 and a mounting 24 are secured to an axle 14. Thus, if roller 20 is pivoted from its stand-by position A into its resting position B, a roller 25 also pivots from its position A to its position B (cf. FIG. 3). The stand-by position is monitored by a limit switch 32. The resting position is detected by a limit switch 33, a screw provided on a lever 35 coming in contact with this limit switch. The end 31 of a lifting spindle 43 is connected to lever 35 at a pivot point 37. This pivoting takes place in the optimum and adjustable phase of the operation of winding the sheet of dough on reel 18. The likewise positively actuated pivoting back of rollers 20 and 25 from position B to position A takes place after the last sheeting operation has been detected by a light barrier and in ample time before the sheet of dough arrives at reel 18 to be wound.

The rolled-out sheet of dough on conveyor belt 7 passes onto conveyor belt 19 and is wound on reel 18, belt 27 ensuring that the sheet of dough to be wound rests correctly on reel 18. After an adjustable number of revolutions of dough reel 18, guide roller 20, with part of conveyor belt 19, and pressing roller 25 are pivoted from position A to position B. Reel 18 is kept rotating in position B by the horizontally running conveyor belt 19, which is in contact with it, or with the outermost turn of the dough. Owing to the pivoting of rollers 20 and 25 from position A to position B, the winding operation is not impaired by the increasing diameter of the wound sheet of dough.

Figure 3:
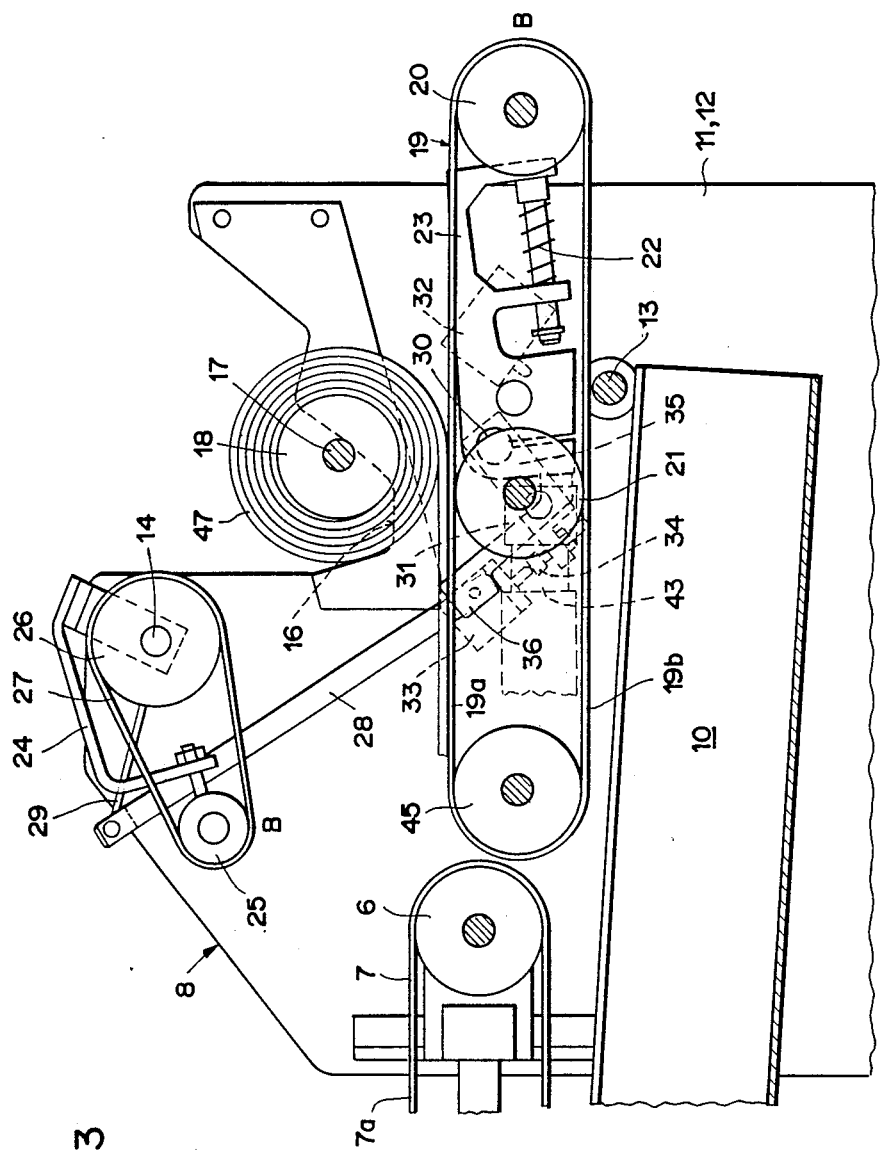
FIG. 3 is an elevation of the sheet winder, the swivel support being in the resting position B.

FIG. 3 illustrates the dough-sheet winder when swivel support 23, and hence rollers 20 and 25, are in resting position B.

Figure 4:
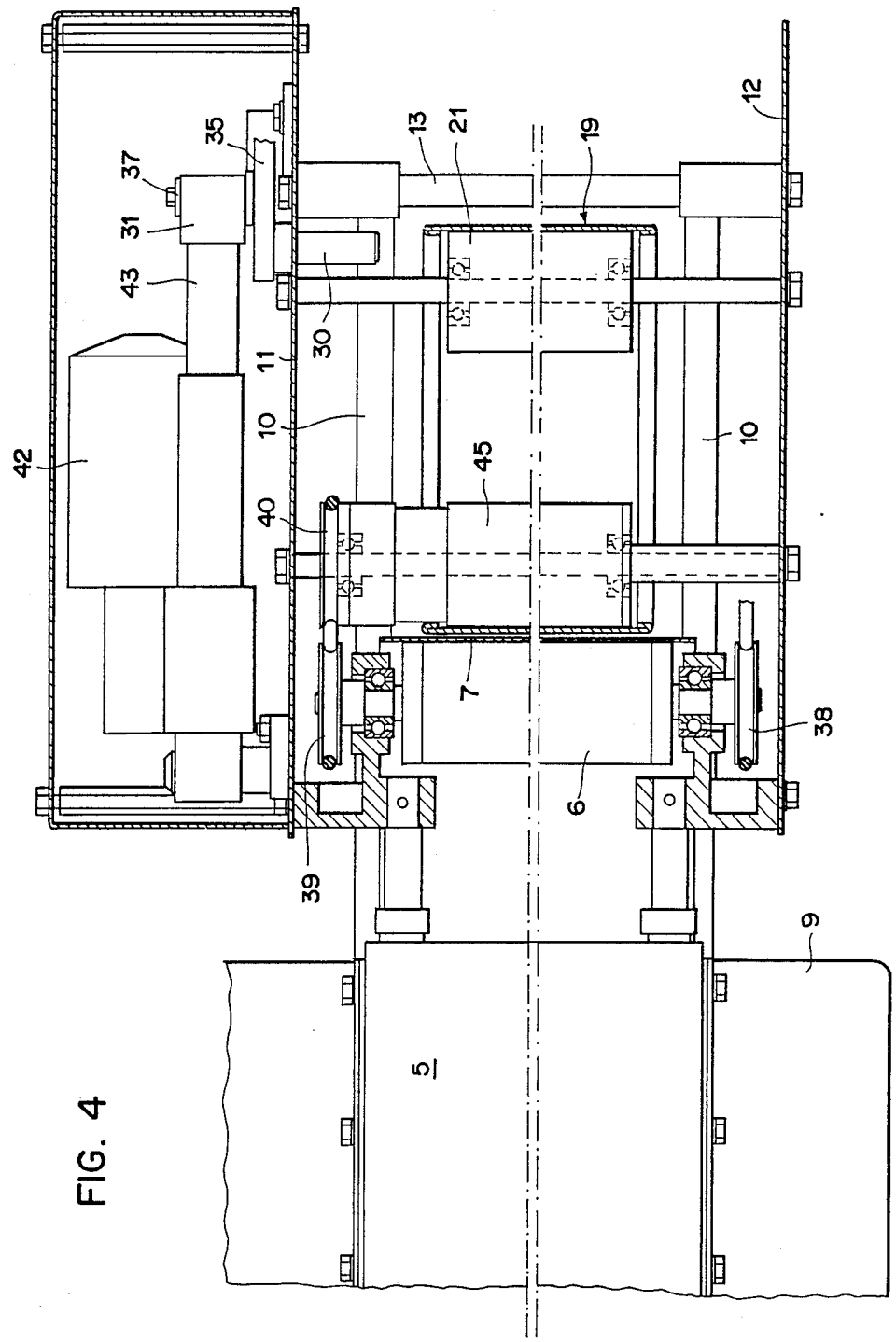
FIGS. 4-6 are sections taken on the lines IV—IV, V—V, and VI—VI of FIG. 2, respectively.

In FIG. 4, a section taken on the line IV—IV of FIG. 2, the axle of roller 6 at the end of conveyor belt 7 is seen to bear drive wheels 38, 39. Wheel 39 is connected to a drive wheel 40 fixed to roller 45. A spindle motor 42 is mounted on side plate 11. By means of lifting spindle 43 of spindle motor 42, lever 35 joined to axle 30, and thus swivel support 23, is pivoted.

Figure 5:
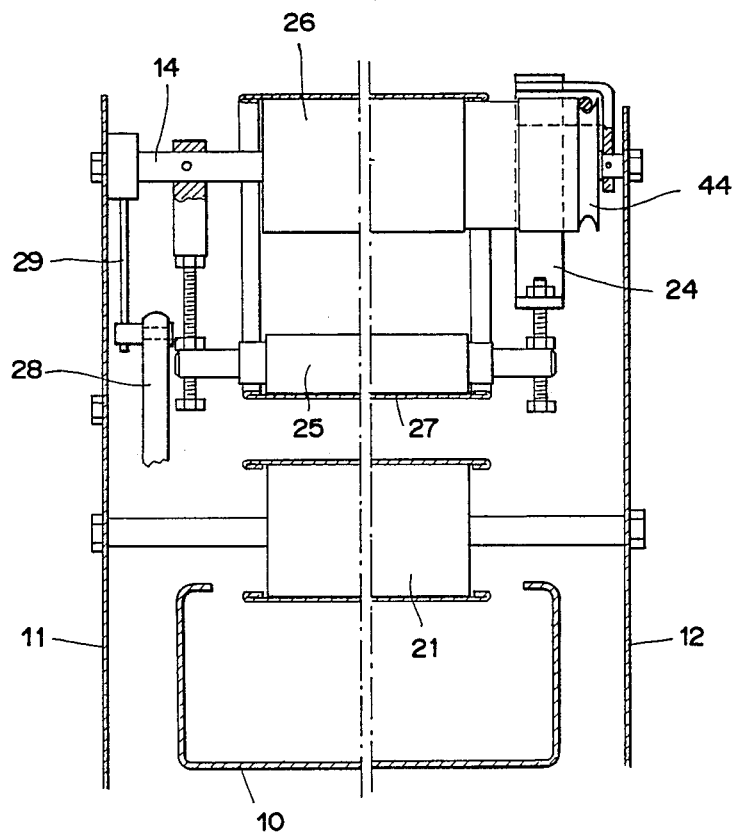

FIG. 5, a section taken on the line V—V of FIG. 2, shows particularly the arrangement of belt 27, as well as its drive by means of drive roller 26 and guide or pressing roller 25. Drive roller 26 is driven by a drive wheel 44 connected thereto from drive wheel 38.

Figure 6:
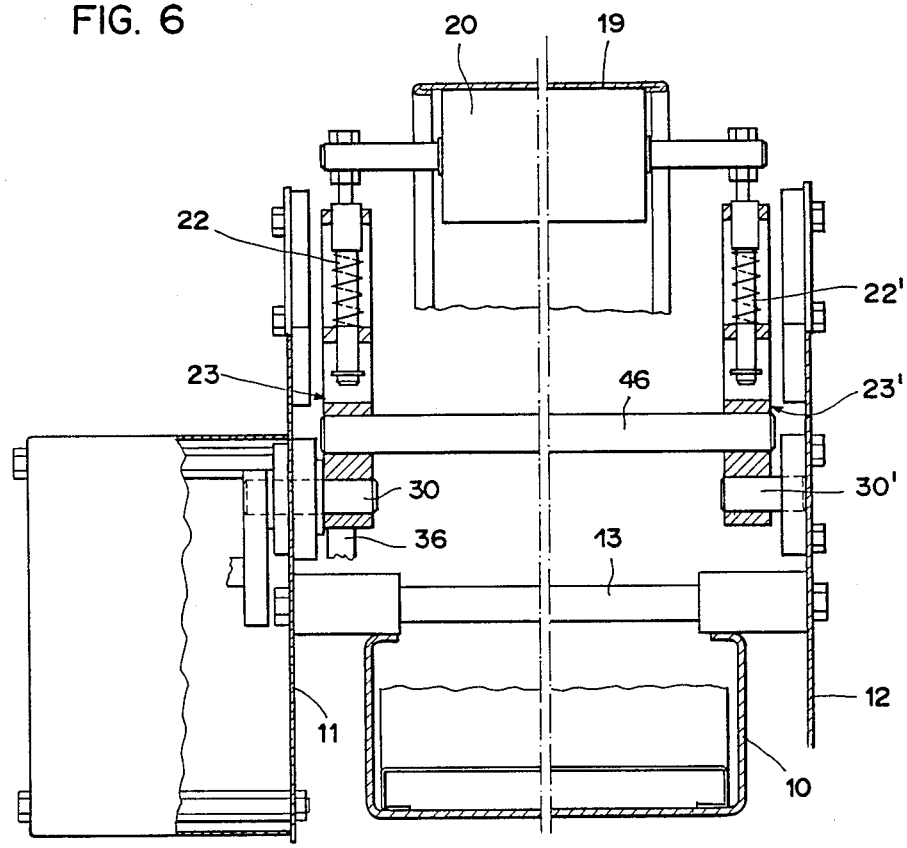

In FIG. 6, a section taken on the line VI—VI of FIG. 2, the two symmetrical parts of swivel support 23 are seen to be connected by a bar 46.

Figure 7:
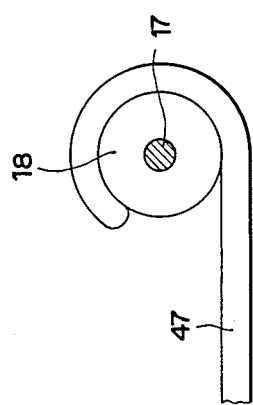

FIG. 7 shows the winding on reel 18 of a thick sheet of dough 47, e.g., 10 mm thick. Upon the last pass of the rolled-out sheet of dough through the sheeting cylinders, a light barrier is actuated, whereupon, in the case of the maximum dough thickness described according to FIG. 7, about 4 sec. elapse until swivel support 23 is pivoted by spindle motor 42.

Figure 8:
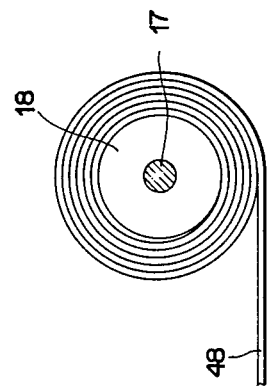
FIGS. 7 and 8 shows the winding operation onto the dough reel for a very thick and a very thin sheet of dough, respectively.

In FIG. 8, the winding operation of a sheet of dough 48 having a thickness of about 1 mm is depicted. Upon the last pass of the sheet of dough through the sheeting cylinders, a light barrier is actuated, whereupon in the case of a minimal dough thickness described according to FIG. 8, about 5 sec. elapse until swivel support 23 is pivoted from position A into position B.

A novel aspect of the inventive arrangement described with reference to the drawings is, among other things, that during winding of the dough, after about one revolution of reel 18 guide roller 20 runs in a continuously linear manner from stand-by position A to resting position B. For very thick dough, it is exceptionally important that after about one revolution of reel 18, rollers 20 and 25 be pivoted from position A to position B. When thin dough is used, several layers may be wound on reel 18 before pivoting takes place.

The thinner the dough is sheeted, the more tension it develops, and the slower it runs onto conveyor belt 7. This means that thick dough reaches dough reel 18 sooner. With the aid of the light barrier in the region of sheeting cylinders 2, as well as of the control electronics for actuating spindle motor 42, the moment at which rollers 20 and 25 are swung from position A to position B is optimized.

Another advantage of the tiltability of guide roller 20 with conveyor belt 19 into resting position B is that during sheeting, the sheet of dough on conveyor belt 7 can run out unhindered under dough reel 18 onto a table situated behind dough-sheet winder 8.

What is claimed is:

1. In a dough sheeter having a pair of sheeting cylinders, two conveyors respectively disposed on either side of the pair of cylinders, each of the conveyors having a frame, two rollers, and a conveyor belt, and a dough winder affixed to a frame of one of the conveyors, wherein the improvement comprises:

a dough reel, a support roller mounted stationary beneath said reel, a motor, a swivel support pivotable by means of said motor from a resting position into a stand-by position, a guide roller disposed on said swivel support, and a further conveyor belt driven by one of said conveyors, running over said guide roller, and having upper and lower belt sides, at least one of said belt-sides being supported on said support roller, said upper belt-side of said further conveyor belt running over part of the circumference of said dough reel to initiate winding of a sheet of dough resting upon said further conveyor belt when said swivel support is pivoted into said stand-by position, and said swivel support being pivotable by said motor into said resting position after an adjustable winding phase of the sheet of dough onto said dough reel, whereby the sheet of dough can be further wound unhindered onto said dough reel.

2. The dough sheeter of claim 1, further comprising a pair of rollers composed of a pressing roller and a drive roller, a belt connecting said pair of rollers to one another, and means operatively connecting said swivel support to said pair of rollers, whereby in the stand-by position of said guide roller said belt rests against said reel, and in the resting position of said guide roller said belt is remote from said reel.

3. The dough sheeter of claim 1, further comprising two limit switches for respectively detecting the resting position and the stand-by position of said swivel support.

4. The dough sheeter of claim 3, further comprising control means actuatable by said sensor means and said limit switches for starting and stopping said motor.

5. In a dough winder for a dough sheeter having a dough reel, a conveyor belt for receiving a sheet of dough and conveying it to the dough reel, a drive roller, a support roller, and a guide roller movable between a resting position and a stand-by position, the conveyor belt running over the drive roller, the support roller, and the guide roller and resting at least in part against the dough reel when the guide roller is in the stand-by position, wherein the improvement comprises:

a motor and a swivel support connected to said guide roller and pivotable by said motor from the stand-by position into the resting position.

6. The dough winder of claim 5, further comprising a pair of rollers composed of a pressing roller and a drive roller, a belt connecting said pair of rollers to one another, and means operatively connecting said swivel support to said pair of rollers, whereby in the stand-by position of said guide roller said belt rests against said reel, and in the resting position of said guide roller said belt is remote from said reel.

7. The dough winder of claim 5, further comprising two limit switches for respectively detecting the resting position and the stand-by position of said swivel support.

* * * * *